United States Patent
Ayyadurai et al.

(10) Patent No.: US 11,537,796 B2
(45) Date of Patent: Dec. 27, 2022

(54) DEVICE INDEPENDENT TEXT SUGGESTION SERVICE FOR AN APPLICATION HOSTING PLATFORM

(71) Applicant: Citrix Systems, Inc., Fort Lauderdale, FL (US)

(72) Inventors: Revathi Ayyadurai, Bangalore (IN); Santosh Sampath, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 17/327,882

(22) Filed: May 24, 2021

(65) Prior Publication Data

US 2021/0279416 A1    Sep. 9, 2021

Related U.S. Application Data

(63) Continuation of application No. 16/710,762, filed on Dec. 11, 2019, now Pat. No. 11,042,704.

(51) Int. Cl.
*G06F 3/0488* (2022.01)
*G06F 40/274* (2020.01)
*G06F 3/04886* (2022.01)
*G06F 40/242* (2020.01)

(52) U.S. Cl.
CPC ........ *G06F 40/274* (2020.01); *G06F 3/04886* (2013.01); *G06F 40/242* (2020.01)

(58) Field of Classification Search
CPC ... G06F 40/274; G06F 40/242; G06F 3/04886
See application file for complete search history.

(56) References Cited

U.S. PATENT DOCUMENTS

| | | | | |
|---|---|---|---|---|
| 10,558,749 | B2* | 2/2020 | Hwang | G06F 40/274 |
| 2007/0233463 | A1* | 10/2007 | Sparre | G06F 40/274 |
| | | | | 704/10 |
| 2010/0325539 | A1* | 12/2010 | Nedzlek | G06F 16/93 |
| | | | | 715/257 |
| 2011/0246575 | A1* | 10/2011 | Murayama | G06F 16/93 |
| | | | | 709/204 |
| 2014/0163954 | A1* | 6/2014 | Joshi | G06F 3/0237 |
| | | | | 704/9 |
| 2018/0217976 | A1* | 8/2018 | Hwang | G06F 40/242 |

(Continued)

*Primary Examiner* — Anil K Bhargava
(74) *Attorney, Agent, or Firm* — Hoffman Warnick LLC

(57) ABSTRACT

A system, method and program product that provides user specific text suggestions across a set of hosted applications. A disclosed method includes: initiating a session with an application hosting platform for a user using a client device, wherein the platform includes a plurality of applications; accessing a dictionary associated with the user, wherein the dictionary provides text suggestions in response to inputted keyboard data and the dictionary is applicable for the user across each of the plurality of applications; deploying a selected application from the to the user at the client device; intercepting keyboard data entered by the user within the selected application; analyzing intercepted keyboard data and generating text suggestions specific to the user using the dictionary associated with the user; and outputting text suggestions within the selected application. The text suggestions are generated independently of capabilities of deployed application and operating systems running on the client device.

20 Claims, 4 Drawing Sheets

(56) References Cited

U.S. PATENT DOCUMENTS

2018/0349348 A1* 12/2018 Adams ................. G06F 40/274
2020/0364293 A1* 11/2020 Dhillon ................ G10L 15/063
2020/0379725 A1* 12/2020 Dhillon ................ G06F 40/284

* cited by examiner

DEVICE INDEPENDENT TEXT SUGGESTION SERVICE FOR AN APPLICATION HOSTING PLATFORM

BACKGROUND OF THE DISCLOSURE

Most modern keyboard interfaces, e.g., deployed in smartphones, tablets, operating systems, applications, etc., support "text suggestions." Text suggestions are generated in response to a small number of characters entered by a user. They may for instance appear in a pop-up window or within a defined region of a display with proposed words or phrases intended to speed up the input of text. Text suggestions may include spelling corrections, predicted next words, autocompletes, etc.

Text suggestions generally rely on a local dictionary of words and phrases that are triggered by an inputted text pattern. For example, if a user enters a misspelled word, one or more suggested words may be displayed that have the highest likelihood of user's actual intent. Similarly, if the user begins typing a sentence, one or more completed sentences may be displayed for the user to select. The dictionary can be trained over time as the user selects or ignores suggestions. Various natural language processing/machine learning technologies are known to train and update text suggestion dictionaries. Regardless of the particular technology utilized, the typing habits of the user (or group of users) are imparted into the dictionary to offer suggestions having the greatest probability of usefulness. Text suggestions accordingly provide personalized typing shortcuts that simplify keyboard inputs for a given platform.

BRIEF DESCRIPTION OF THE DISCLOSURE

Aspects of this disclosure provide a system, method and program product that provide personalized cross-platform text suggestions. Accordingly, a single dictionary is trained and maintained for a given user that is utilized across multiple applications deployed from an application hosting platform.

A first aspect of the disclosure provides an application hosting platform comprising a memory and a processor coupled to the memory configured to perform the steps of implementing an application manager to deploy a plurality of applications to remote client devices and a text suggestion service that provides user specific text suggestions across each of the applications. The text suggestion service is configured to access a dictionary associated with an identified user, wherein the dictionary provides text suggestions in response to inputted keyboard data and wherein the dictionary is applicable for the identified user across each of the applications. The engine also intercepts inputted keyboard data entered by the identified user within a deployed application on a remote client device and analyzes intercepted keyboard data from the deployed application to generate text suggestions specific to the identified user using the dictionary associated with the identified user. Text suggestions are outputted for the identified user within the deployed application. Text suggestions are generated independently of existing capabilities of the deployed application and operating system running on the remote client device.

A second aspect discloses a method that provides user specific text suggestions across a set of hosted applications. The method includes initiating a session with an application hosting platform for a user using a remote client device, wherein the application hosting platform includes a plurality of applications and accessing a dictionary associated with the user, wherein the dictionary provides text suggestions in response to inputted keyboard data and wherein the dictionary is applicable for the user across each of the plurality of applications. The method further deploys a selected application from the plurality of applications to the user at the remote client device and intercepts keyboard data entered by the user within the selected application. Intercepted keyboard data from the user is intercepted and text suggestions specific to the user are generated using the dictionary associated with the user. Text suggestions are then outputted for the user within the selected application. Text suggestions are generated independently of existing capabilities of the selected application and operating system running on the remote client device.

A third aspect of the disclosure provides a computer program product stored on a computer readable storage medium, which when executed by a computing system, provides user specific text suggestions across a set of hosted applications. Included is program code for initiating a session with an application hosting platform for a user using a remote client device, wherein the application hosting platform includes a plurality of applications. Also provided is program code for accessing a dictionary associated with the user, wherein the dictionary provides text suggestions in response to inputted keyboard data and wherein the dictionary is applicable for the user across each of the plurality of applications. Program code is further provided for deploying a selected application from the plurality of applications for the user at the remote client device and program code for intercepting keyboard data entered by the user within the selected application. Also provided is program code for analyzing intercepted keyboard data from the user and generating text suggestions specific to the user using the dictionary associated with the user and program code for outputting text suggestions for the user within the selected application. The text suggestions are generated independently of existing capabilities of the selected application and operating system running on the remote client device.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for providing consistent user specific text suggestions across different deployed applications running on heterogeneous client devices. In particular, text suggestions are generated independently of existing capabilities of the deployed applications and operating systems running on client devices. Previously, text suggestion engines were implemented as built-in features of a particular resource, i.e., each unique application, operating system, device, etc., utilized its own dictionary and analytics to generate suggestions. The present approach leverages the architecture of application hosting platforms, which host and deploy applications to end users via remote client devices, to provide user specific text suggestions across heterogeneous devices running applications deployed from the application hosting platform.

Figure 1:
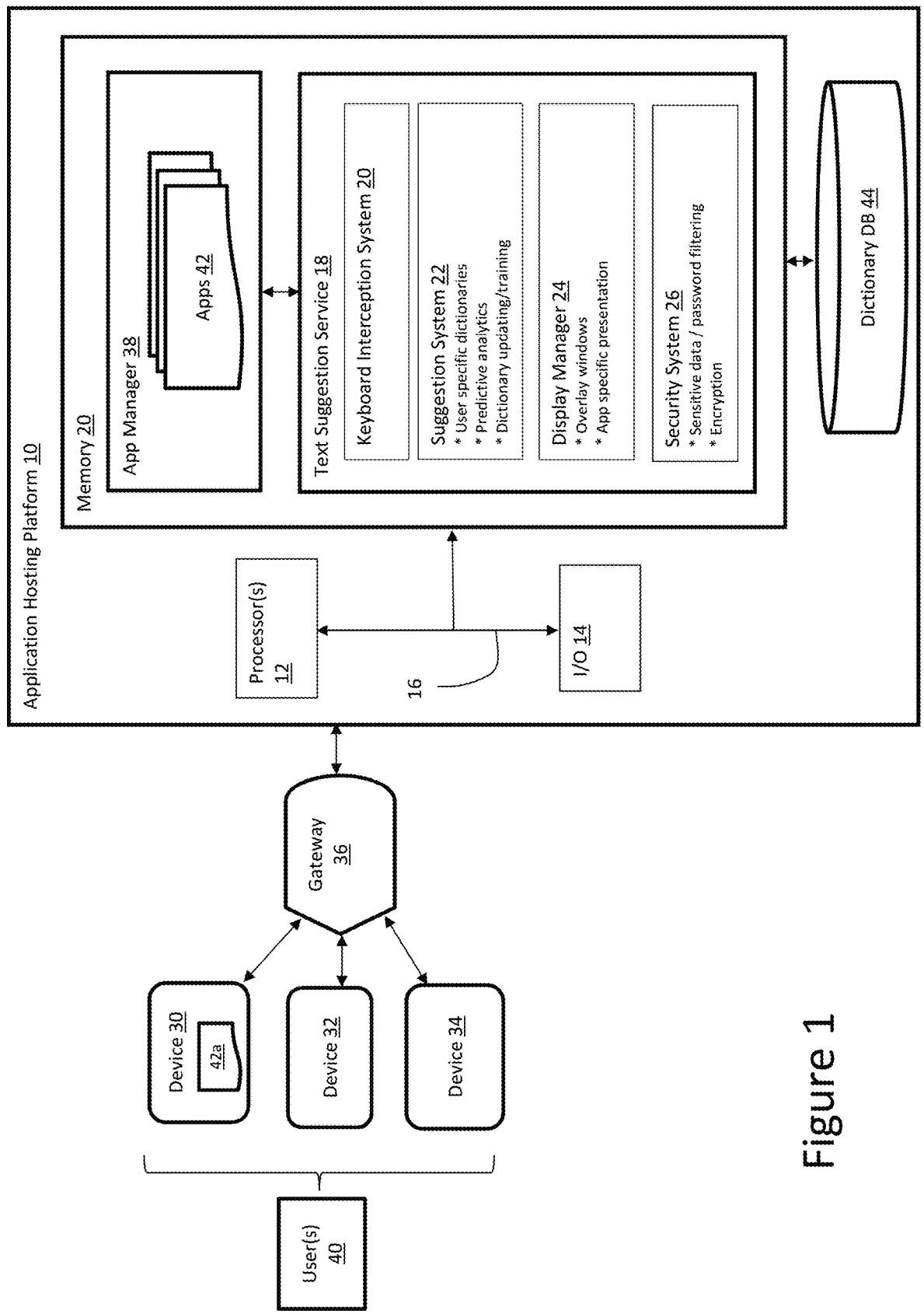
FIG. 1 depicts an application hosting platform, in accordance with an illustrative embodiment.

FIG. 1 depicts an illustrative application hosting platform 10 configure to provide such functionality. Application hosting platform 10 may for example comprise a cloud platform, a software as a service (SaaS) platform, an application server, a virtual application deployment platform or any other platform capable of deploying applications (i.e., Apps) 42 to remote client devices 30, 32, 34. Remote client devices 30, 32, 34 may for example comprise smart phones, desktop computers, Internet of Things (IoT) devices, thin clients, browsers, autonomous systems, tablets, etc. In this example, application hosting platform 10 includes an application manager 38 configured to store and deploy a plurality of different applications 42 via a gateway 36 to devices 30, 32, 34 for a user (or users) 40. One such illustrative platform 10 includes CITRIX® Virtual Apps and Desktop (CVAD), which is capable of providing on-demand applications and desktops (i.e., Apps 42) to any type of device 30, 32, 34.

In addition to the application manager 38, platform 10 includes a text suggestion service 18 that coordinates text suggestions for the plurality of applications 42 managed by application manager 38. In this embodiment, text suggestion service 18 is substantially implemented within platform 10, however it is understood that some or all of the functionality may be distributed and implemented outside of the platform 10, e.g., at the device level, or via a third party service. In this case, when a user 40 begins a session with the platform 10, the user 40 is identified and a dictionary associated with the user 40 is accessed by the text suggestion service 18 from a set of user specific dictionaries, e.g., in dictionary database 44. Whenever an application (e.g., 42a) is deployed to a device (e.g., device 30) for the user 40, text suggestion service 18 can provide text suggestions for the user 40 as the user 40 interacts with a deployed application 42a.

Text suggestion service 18 generally includes: a keyboard interception system 20 that intercepts keyboard data (i.e., characters) inputted by the user 40 within a deployed application 42a; a suggestion system 22 that generates text suggestions for the user 40; a display manager 24 that handles display of text suggestions within the deployed application 42a for the user 40; and a security system 26 that, e.g., encrypts/decrypts the user's dictionary and avoids storing of passwords and other sensitive data in the user's dictionary.

Keyboard interception system 20 can capture keyboard data from any field in a deployed application 42a, including, e.g., plain or formatted text, URLs, email addresses, text messages, email content, word processing inputs, search queries, etc. Interception could be implemented at either the platform 10 or at a device 30, 32, 34. In the example shown, interception occurs at the platform 10, which may for example be implemented with a local text echo feature utilizing a MS Windows® UIAutomation application programming interface (API). The API provides access to any user interface elements, including keyboard inputs. To implement the API, an event handler is registered with the operating system (OS) environment, and as text change notifications are pushed to the event handler, the intercepted text is collected by the keyboard interception system 20.

Other types of data such as handwriting strokes or audio input could likewise be intercepted, and for example be converted to text using speech recognition. Accordingly, for the purposes of this disclosure, the term keyboard inputs/data refers to any text based data whether generated directly from a keyboard or via some other source such as a natural language processing system.

In an alternative embodiment, keyboard inputs could be collected directly by the device 30, 32, 34 and forwarded back to the platform 10 without the use of an OS event handler. In an SaaS platform, SaaS applications could generate text suggestions by "hooking" keyboard inputs when running inside an embedded-browser, and utilized stored dictionaries at the application or URL level. A hook is a mechanism by which an application can intercept events, such as messages, mouse actions, and keystrokes. A function that intercepts a particular type of event is implemented with a hook procedure that can act on each event it receives. For example, WH_KEYBOARD is a Microsoft Windows procedure for obtaining keyboard inputs.

As keyboard inputs are collected, suggestion system 22 searches for matching character strings in the user's dictionary and returns text suggestions. Initially, a default dictionary may be provisioned for each user and over time, each dictionary can be trained and personalized (i.e., updated) for the given user. For instance, whenever a user responds to (e.g., selects, replaces, adds to, or ignores) a text suggestion, the action can be analyzed and used to enhance future suggestions within the dictionary. Any type of predictive analytics engine may be used to train the user's dictionary to, e.g., prioritize and sort suggestions based on context, weightings, time of usage, etc. Further, dictionaries 44 can be updated or implemented manually or automatically with administrator inputs, e.g., to include common terms used within an organization, or common terms used for specified roles within an organization. Still further, the user 40 can manually enter suggestions that should get triggered in response to inputted characters.

In one embodiment, multiple instances of the user's dictionary may exist on different devices or within different applications. In such a case, the dictionaries instances for a given user would be synchronized on a regular basis.

Once one or more text suggestions are determined by the suggestion system 22, display manager 24 facilitates the presentation of the suggestions with the deployed application 42a. In some cases, the deployed application 42a may have a predefined region or procedure for displaying suggestions (e.g., within a bar above the keyboard, immediately after the display of inputted characters, etc.). In cases where the application 42a does not have a predefined region or procedure, or the display manager 24 does not have access to the predefined region, an overlay window can be generated near the input field. This allows visual suggestion display elements to float over other visual elements. Display manager 24 could likewise be implemented at the platform level or device level. Implementing displays at the platform level may provide a simpler, more uniform presentation. Implementing displays at the device level may provide a greater user experience (UX).

In addition to the above, a security system 26 may be provisioned to ensure that user specific dictionaries are loaded securely during a session, e.g., using OS level encryption facilities such as Keychain, DPAPI, Android Keystore, etc. Furthermore, each dictionary could be stored in an encrypted fashion in database 44 when not used. Access/decryption may be achieved with a passphrase entered by the user 40 at the beginning of a session. Furthermore, security filtering may be utilized to ensure passwords and other sensitive data are not stored in the dictionary.

Figure 2:
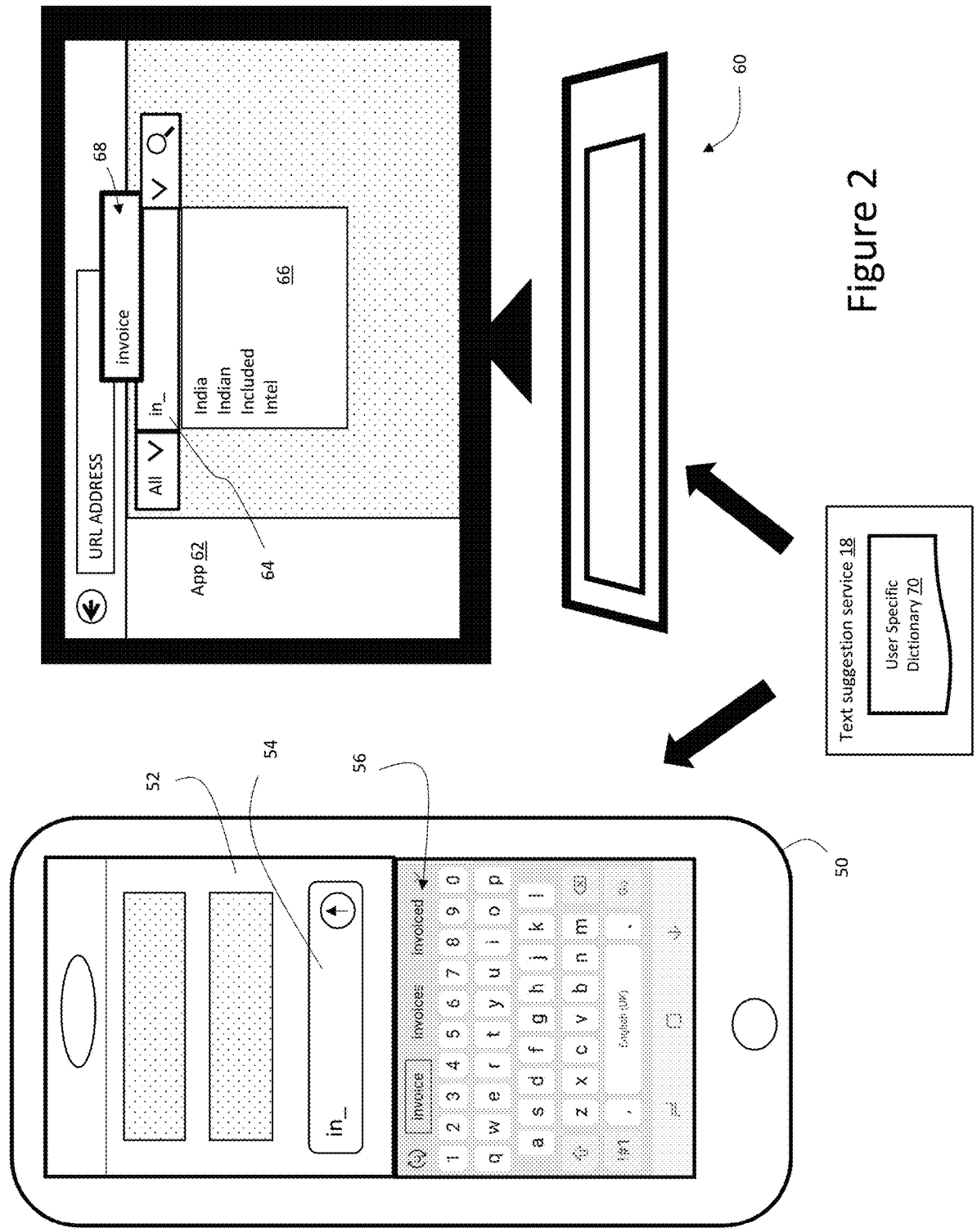
FIG. 2 depicts a use case showing text suggestions generated on two devices, in accordance with an illustrative embodiment.

FIG. 2 depicts an illustrative use case in which text suggestion service 18 is implemented across multiple devices and applications. Text suggestions for a user are generated independently of the capabilities of the application or operating system running on the device, and share a single dictionary 70 for the user. In this example, a first device 50 (e.g., a smart phone) is shown running a first deployed application 52 (e.g., an android based messaging application) and a second device 60 (e.g., a desktop computer) is shown running a second deployed application 62 (e.g., a Windows based search facility). On the first device 50, the user has initiated a session and entered the text characters "in" within a message field 54 of the first deployed application 52. Text suggestions 56 are generated based on the user specific dictionary 70 and displayed by service 18 on the bar above the keyboard, with the suggestion "invoice" being highlighted as the most likely intent of the user. In this case, service 18 is utilizing the existing UX display region in the first application 52 to show suggestions 56. On the second device 60, the same user has initiated a second session and entered the same text characters "in" into a search field 64. In this case, the second deployed application 62 includes an existing facility for generating text suggestions, which is shown in drop down window 66. In addition, service 18 causes a separate overlay window 68 to be displayed, and because a common dictionary 70 is utilized, displays the same text suggestion "invoice" as previously generated by the service 18 on the first device 50. In this case, if the user clicks on the suggested text "invoice" in the separate overlay window 68 generated by service 18, the suggested text "invoice" is inputted back into the deployed application 62.

The overlay window 68 may be a non-editable text window or an overlay window generated by the operating system, i.e., a window manager rendered on either the client or the server. When the overlay window is handled by the server, an overlay region will be sent as image to the client along with remote graphics data. When the user clicks on the overlay region, the server detects the overlay and inputs a scan code corresponding to the text displayed to the application. When the overlay window is handled by the client, and user clicks on the overlay region, scan codes are sent through the keyboard virtual channel. During interception, characters already entered by the user to the application will be captured. After the user clicks on the overlay region, the remaining scan codes for the selected text are sent to the application.

Figure 3:
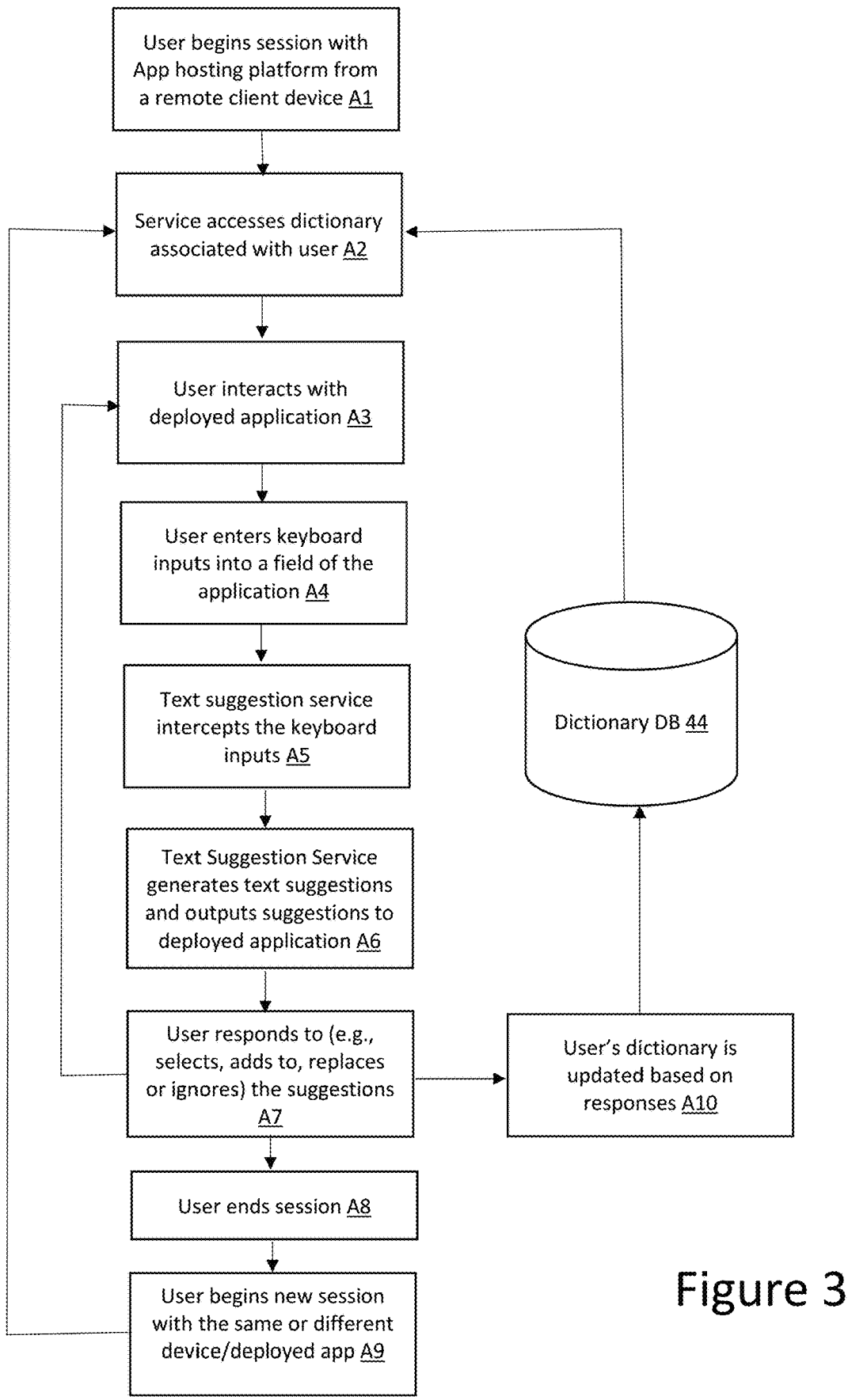
FIG. 3 depicts a flow diagram of a method of implementing a text suggestion service, in accordance with an illustrative embodiment.

FIG. 3 depicts an illustrative method for implementing text suggestion service 18 (with reference to FIG. 1). At A1, a user 40 begins a session with the application hosting platform 10 from a remote client device 30, and at A2, the text suggestion service 18 accesses a dictionary associated with the user 40 from dictionary database 44. At A3, the user 40 interacts with a deployed application 42a on their device 30, and at A4, the user 40 enters keyboard inputs in a field of the deployed application 42a. At A5, the text suggestion service 18 intercepts the keyboard inputs and generates and displays suggestions to the deployed application 42a at A6. At A7, the user 40 responds to the suggestions, e.g., by selecting a suggestion, adding a new suggestion, replacing the suggestion, ignoring the suggestion, etc., and at A10 the user's dictionary is updated based on the user's response. Updating of the dictionary may occur immediately based on the response, or responses may be saved for analysis at a later time. Assuming the user 40 does not end the session at A8, the process loops back to A3 where the user 40 continues to interact with the deployed application 42a.

Sometime after the user 40 ends the session (or concurrently therewith), the user 40 may begin a new session with same or different device/deployed application at A9. The process loops back to A2, where the text suggestion service 18 re-accesses the dictionary associated with the user 40 and the process repeats. Note that the dictionary may include updates resulting from previous sessions.

Figure 4:
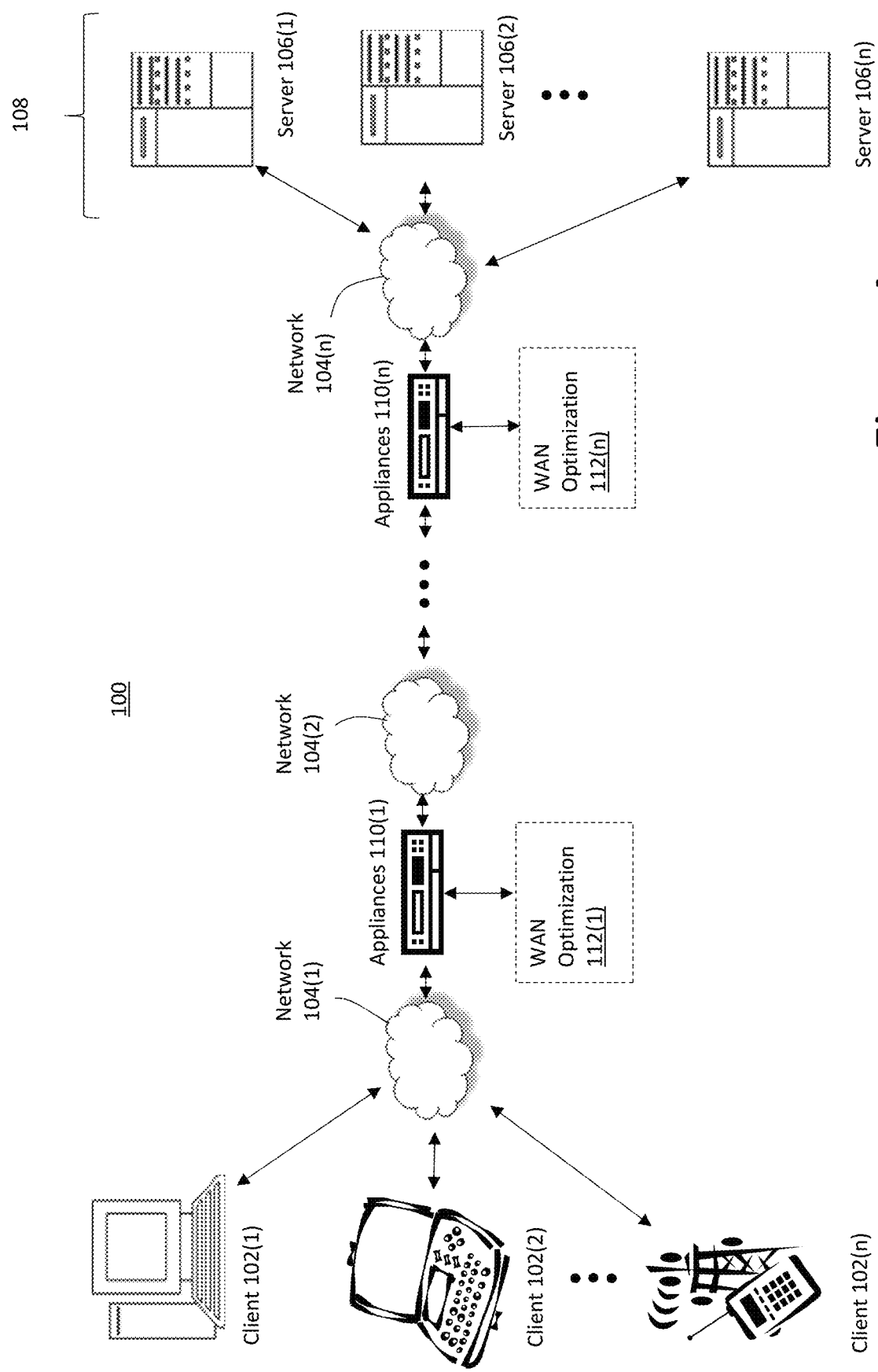
FIG. 4 depicts a network configuration, in accordance with an embodiment of the invention.

Referring to FIG. 4, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 110(1)-110n (generally referred to as appliance(s) 110 or gateway(s) 110).

Although the embodiment shown in FIG. 4 shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 4, one or more appliances 110 may be located at various points or in various communication paths of network environment 100. For example, appliance 110(1) may be deployed between two networks 104(1) and 104(2), and appliances 110 may communicate with one another to work in conjunction to, for example, accelerate network traffic between clients 102 and servers 106. In other embodiments, the appliance 110 may be located on a network 104. For example, appliance 110 may be implemented as part of one of clients 102 and/or servers 106. In an embodiment, appliance 110 may be implemented as a network device such as Citrix networking (formerly NetScaler®) products sold by Citrix Systems, Inc. of Fort Lauderdale, Fla.

As shown in FIG. 4, one or more servers 106 may operate as a server farm 108. Servers 106 of server farm 108 may be logically grouped, and may either be geographically co-located (e.g., on premises) or geographically dispersed (e.g., cloud based) from clients 102 and/or other servers 106. In an embodiment, server farm 108 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 4, in some embodiments, appliances 110 may include, be replaced by, or be in communication with, one or more additional appliances, such as WAN optimization appliances 112(1)-112(n), referred to generally as WAN optimization appliance(s) 112. For example, WAN optimization appliance 112 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 112 may be implemented as Citrix SD-WAN products sold by Citrix Systems, Inc. of Fort Lauderdale, Fla.

In described embodiments, clients 102, servers 106, and appliances 110 and 112 may be deployed as and/or executed on any type and form of computing device, such as any desktop computer, laptop computer, or mobile device capable of communication over at least one network and performing the operations described herein. For example, clients 102, servers 106 and/or appliances 110 and 112 may each correspond to one computer, a plurality of computers, or a network of distributed computers such as computing system 10 shown in FIG. 1.

Application Hosting Platform 10 (FIG. 1) may for example be implemented by a cloud computing environment that employs a network of remote, hosted servers to manage, store and/or process data, and may generally be referred to, or fall under the umbrella of, a "network service." The cloud computing environment may include a network of interconnected nodes, and provide a number of services, for example hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-premises computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-premises computing environments in a hybrid configuration.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Application hosting platform 10 (FIG. 1) may comprise any type of computing device that for example includes at least one processor 12, memory, an input/output (I/O) 14, e.g., one or more I/O interfaces and/or devices, and a communications pathway or bus 16. In general, the processor(s) execute program code which is at least partially fixed in memory. While executing program code, the processor(s) can process data, which can result in reading and/or writing transformed data from/to memory and/or I/O for further processing. The pathway provides a communications link between each of the components in the computing device. I/O can comprise one or more human I/O devices, which enable a user to interact with the computing device and the computing device may also be implemented in a distributed manner such that different components reside in different physical locations.

Memory 20 may comprise volatile memory (e.g., RAM) and/or non-volatile memory e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof, etc. I/O 14 may include a user interface, a graphical user interface (GUI) (e.g., a touchscreen, a display, etc.) and one or more input/output (I/O) devices (e.g., a mouse, a keyboard, etc.). Computing system 10 typically may also include an operating system, additional applications, data, peripherals, etc. Computing system 10 is shown merely as an example, as clients, servers and/or appliances and may be implemented by any computing or processing environment and with any type of machine or set of machines that may have suitable hardware and/or software capable of operating as described herein.

Processor(s) 12 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

In described embodiments, a first computing device may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An application hosting platform, comprising:
a memory; and
a processor coupled to the memory and configured to:
virtually deploy an application running on the application hosting platform to a remote client device;
access a dictionary associated with an identified user, the dictionary providing user specific text suggestions across each of a plurality of applications and the dictionary being applicable for the identified user across the plurality of applications;
receive, at the application hosting platform, inputted keyboard data as keystrokes are entered by the identified user into displayed fields of the application on the remote client device;
intercept, at the application hosting platform, inputted keyboard data;
generate, based on the intercepted inputted keyboard data, text suggestions specific to the identified user using the dictionary associated with the identified user; and
output the text suggestions to the identified user.

2. The application hosting platform of claim 1, wherein the platform includes one of: a cloud platform, a software as a service (SaaS) platform, a server, and a virtual application deployment platform.

3. The application hosting platform of claim 1, wherein intercepting keyboard data includes utilizing an event handler that interfaces with an operating system running the deployed application.

4. The application hosting platform of claim 1, wherein intercepting keyboard data includes receiving keyboard inputs directly from the remote client device.

5. The application hosting platform of claim 1, wherein the text suggestion service retrieves the dictionary for the identified user in response to the identified user beginning a new session.

6. The application hosting platform of claim 1, wherein the text suggestion dictionary for the identified user is updated and personalized based on responses by the identified user with respect to any of the plurality of applications independently of existing capabilities of the plurality of applications and of the remote client device.

7. The application hosting platform of claim 1, wherein text suggestions for the user are output in an overlay window that appears over the deployed application on the remote client device.

8. A method that provides user specific text suggestions across a set of hosted applications, comprising:
initiating a session with an application hosting platform for a user using a remote client device, wherein the application hosting platform includes a plurality of applications;
accessing a dictionary associated with the user, wherein the dictionary provides text suggestions in response to inputted keyboard data and wherein the dictionary is applicable for the user across the plurality of applications;
virtually deploying a selected application from the plurality of applications to the user at the remote client device;
receiving, at the application hosting platform, inputted keyboard data as keystrokes are entered by the identified user into displayed fields of the selected application on the remote client device;
intercepting, at the application hosting platform, the inputted keyboard data;

generating, based on the inputted keyboard data, text suggestions specific to the user using the dictionary associated with the user; and outputting text suggestions for the user of the selected application.

9. The method of claim 8, wherein the application hosting platform includes one of: a cloud platform, a software as a service (SaaS) platform, a server, and a virtual application deployment platform.

10. The method of claim 8, wherein intercepting keyboard data includes utilizing an event handler that interfaces with an operating system running the selected application.

11. The method of claim 8, wherein intercepting keyboard data includes receiving text directly from the remote client device.

12. The method of claim 8, wherein the dictionary associated with the user is updated and personalized based on responses of the user while engaged with any of the plurality of applications independently of existing capabilities of the applications and of the remote client device.

13. The method of claim 12, wherein the text suggestions are generated independently of existing capabilities of the selected application and operating system running on the remote client device.

14. The method of claim 8, wherein text suggestions for the user are output in an overlay window that appears over the selected application on the remote client device.

15. A computer program product stored on a non-transitory computer readable storage medium, which when executed by a computing system, provides user specific text suggestions across a set of hosted applications, wherein the computer program product comprises:

program code for initiating a session with an application hosting platform for a user using a remote client device, wherein the application hosting platform includes a plurality of applications;

program code for accessing a dictionary associated with the user, wherein the dictionary provides text suggestions in response to inputted keyboard data and wherein the dictionary is applicable for the user across each of the plurality of applications;

program code for virtually deploying a selected application from the plurality of applications for the user at the remote client device;

program code for receiving, at the application hosting platform, inputted keyboard data as keystrokes are entered by the identified user into displayed fields of the selected application on the remote client device;

program code for intercepting, at the application hosting platform, inputted keyboard data;

program code for generating, based on the inputted keyboard data, text suggestions specific to the user using the dictionary associated with the user; and program code for outputting text suggestions for the user of the selected application.

16. The program product of claim 15, wherein the application hosting platform includes one of: a cloud platform, a software as a service (SaaS) platform, a server, and a virtual application deployment platform.

17. The program product of claim 15, wherein the text suggestions are generated independently of existing capabilities of the selected application and operating system running on the remote client device.

18. The program product of claim 15, wherein the program code for intercepting keyboard data includes receiving data directly from the remote client device.

19. The program product of claim 15, wherein the dictionary associated with the user is updated and personalized based on responses of the user while engaged with any of the plurality of applications independently of existing capabilities of the applications and of the remote client device.

20. The program product of claim 19, wherein the dictionary associated with the user is further updatable based on inputs from an administrator.

* * * * *